United States Patent [19]
Schwarz, Jr.

[11] Patent Number: 5,306,979
[45] Date of Patent: Apr. 26, 1994

[54] MULTIPLEXING INCREMENTAL LINEAR ACTUATOR SYSTEM

[76] Inventor: John F. Schwarz, Jr., 1125 Saunders Crescent, Ann Arbor, Mich. 48103

[21] Appl. No.: 957,471

[22] Filed: Oct. 7, 1992

[51] Int. Cl.$^5$ ............................................. H01L 41/08
[52] U.S. Cl. ..................................... 310/328; 310/26; 60/527
[58] Field of Search .................. 310/26, 328; 60/527, 60/528, 529

[56] References Cited

U.S. PATENT DOCUMENTS

| | | | |
|---|---|---|---|
| 4,197,708 | 4/1980 | Milton et al. | 60/527 |
| 4,306,415 | 12/1981 | Hochstein et al. | 60/527 |
| 4,642,802 | 2/1987 | Pozzo et al. | 310/26 |
| 4,742,261 | 5/1988 | Rich et al. | 310/328 |
| 4,811,564 | 3/1989 | Palmer | 60/527 |
| 4,946,380 | 8/1990 | Lee | 623/24 |
| 5,079,920 | 1/1992 | Whitehead et al. | 60/527 |

*Primary Examiner*—Mark O. Budd
*Assistant Examiner*—Thomas M. Dougherty
*Attorney, Agent, or Firm*—John R. Benefiel

[57] ABSTRACT

An actuator system for linear movement comprises an array of movable control wires, a spring-loaded, axially telescoping assembly and two bi-directional one-way clutch assemblies fitted to the ends of the telescoping assembly, the reciprocating compressive action of which operates in concert with the clutch assemblies whereby the wire is alternatingly pulled in one assembly while being ratcheted by the other to achieve incremental linear motion in one selected direction or the other. The telescoping assembly is compressed by a mechanical motion derived preferably from one of several alternate solid state electrical-to-motion transducers. The actuator system is built using the change in length of solid material. The bigger the actuator's scale, the more powerful the actuator. Conversely, since the dimensional changes take place in the material on a molecular level it suggests that very small units could be built in the micro-actuator size. The very large advantage of the microsystem of the present invention is derived from the simplicity of construction. There are no micro-motors or gears or shafts or bearings to build.

12 Claims, 11 Drawing Sheets

MULTIPLEXING INCREMENTAL LINEAR ACTUATOR SYSTEM

BACKGROUND OF THE INVENTION

I. Field of the Invention

The present invention relates generally to linear actuators. More particularly, the present invention relates to an apparatus for linearly displacing an output member in the form of a mechanical control wire, by means of at least two wire-gripping assemblies operating in concert with an intermediate compressible assembly provided therebetween. The wire is gripped by means of two one-way linear clutches setable in either direction. The clutches are mounted on opposite ends of the compressible assembly. The intermediate assembly is contracted by an array of shape memory alloy wires, then allowed to expand thereby pulling tendon wire therethrough.

II. Description of the Relevant Art

It is often desired to apply linear motion to an output member such as a mechanical control wire in order to displace the member to an accurate position.

The rack-and-pinion assembly, the jack screw and the hydraulic cylinder assembly are the preferred and known mechanisms presently used that are able to generate linear motion. Each of these mechanisms has its own special attraction to a given application.

However, while none of these mechanisms is complicated in theory, resulting linear motion actuators themselves are relatively complicated in practice, and usually include expensive and heavy elements such as carefully machined gear and shaft members. Others require expensive, complicated and massive support systems.

Regardless of their cost, complexity and size the known linear actuators systems serve well their specific functions. However, they fail to effectively function in other linear motion areas. For example, in the art of robotics comprising robotic arms, fingers and the like, the required motions are articulate and the required mechanism is light. Motion multiplexing from a single central actuator reduces the multiple duplication of motor weights and equipment costs. In this application, delicate, strong, fast, and accurately controllable movement of one or more control wires is critical. An improved analog for muscles and tendons in robots is wanting.

The known methods of linear actuation fail to meet the very specific and, in their own way, very demanding needs of robotics. Accordingly, prior approaches to providing linear actuators to robot control machines have been assemblages of parts from other technologies, neither being a perfect fit nor a perfect function.

SUMMARY OF THE PRESENT INVENTION

The present invention provides an actuator system for linear movements that overcomes the known problems of actuators when applied to such specific purposes as control (so-called "tendon wires") in robotic mechanisms.

More specifically, the present invention provides an actuator for linear movement comprising an array of linearly-movable control elements preferably comprised of a fluted tendon wire and at least two wire-gripping coupling means per element. Each of the two coupling means comprises clutch assemblies including a pair of independently movable ball carriers having a clutch assembly plate body disposed therebetween. The ball carriers, when engaged, enable one-way tendon wire movement with the direction being controlled by one of the two carriers that have been selected. With a continuously selected ball carrier in each of the two clutches on the tendon wire channel, the telescoping frame motion is rectified by the clutches into incremental tendon wire unidirectional motion until a different clutch combination is selected, the telescoping motion is ceased, or the end of the tendon wire is reached. The selection of both carriers on the fixed or moving clutch plates results in the tendon wire movement being locked to that clutch plate. Motion with locked clutches can still be implemented but it is a multiple sequence motion that requires repeated computer clutch command changes with each incremental move. The clutch ball carriers are released from engagement by spring action after the clutch command is dropped. If the ball carriers of the two clutches on the tendon wire are not in the engaged position, the wire may pass linearly in either direction. When one or the other of the ball carriers of a clutch is in its engaged position, the tendon wire moves in one direction but its movement is selectively prohibited in the other direction.

A one-way clutch assembly is preferably disposed on each of a pair of members provided at the ends of a telescoping assembly and slidably receiving the array of control elements. One member is reciprocally movable, the other is fixed. Accordingly, two clutch assemblies are provided for each fluted tendon wire channel. The telescoping assembly is capable of being alternatingly contracted and released so that if one end's one-way clutch assembly carrier is engaged in one direction and the other end's one-way clutch assembly carrier is engaged in the same direction, the contraction of the telescoping assembly drives the tendon wire incrementally therethrough. Once in the fully contracted (or telescoped) position, the movable end one-way clutch pulls or pushes the tendon wire to the end of that stroke. When the telescoping frame is then released, the one-way clutch on the fixed end secures the tendon wire while the one-way clutch on the movable end ratchets a new bite on the tendon wire for a new stroke. In this manner, a tendon wire is incrementally carried in one direction or the other through the telescoping assembly.

The telescoping assembly is alternatingly contracted or released by means of an array of axially positioned shape memory alloy wires. The shape memory alloy illustrated here is the lightest and simplest and therefore would be preferred for aerospace and robotics applications where weight and simplicity are the overriding design concerns. The use of shape memory alloy wire for all motion in the MAIL ("Multiplexed Actuator, Incremental Linear") design is defined as "Light Technology". In this embodiment, the telescoping tube is provided between the clutch assemblies with an array of tendon wires being provided axially with respect to the telescoping tube.

A number of shrinkable shape memory alloy wires interconnect the two members end plates. The shape memory alloy wires are electrically energized, causing shrinkage. The telescoping assembly is spring-loaded, thereby allowing for the return of the telescoping assembly to its noncontracted state once the current flow on the shape memory alloy wires is removed.

Depending on the total force, the MAIL system of the present invention may be employed (programmed) to move only one fluted tendon wire channel, or it may be employed to move a plurality of tendon wires in sequence or simultaneously, only limited by the sum of the forces required for each wire channel load. In either event, the telescoping assembly and the one-way clutch assemblies are still employed substantially as described above.

Several exchangeable types of electrical clutch actuation power sources may be employed to advantage on the same preferred one-way clutch mechanism. In addition to the illustrated magnetic field and memory wire systems, a piezoelectric stack, or magnetostrictive element is useable. One of the alternate embodiments is electromagnetically operated, and the other is operated by phase-change action of a set of memory wires. In both embodiments, the clutches are composed of two one-way clutches, separately selectable for each of the two tendon wire directions.

Several exchangeable types of power sources for telescoping may be employed to advantage on the same preferred linear actuator mechanism. In addition to the memory wire and the piezoelectric systems, magnetostrictive elements are also useable, each power source having at least one distinct advantage over the other sources. Drive source exploitable differences are in speed, power, and weight. In all embodiments however, the telescoping mechanism performs the same basic function regardless of the drive method.

The use of a computer adds some weight but provides the practical utility of taking charge of the hundreds of details to be managed to obtain good motion results. All serious motion machines require major supervision if the motion is to be articulate and used to accomplish diverse tasks.

The addition of a microprocessor to control incremental movements of the tendon wires channels is preferred, and in this embodiment, low-level control firmware and tables should occupy only about 16K bytes, and 26K bytes of Random Access Memory (RAM) should accommodate simple applications. The addition of the computer program will provide intelligence to the "Light Technology".

The MAIL design provides a mechanism to make linear motion out of oscillating, preferably solid state, motion. The microprocessor provides the element that allows computer speed and accurate assembling of the small motion ticks into inches and feet of movement. The computer-controlled one-way clutch provides the high-speed short motion release and gripping of the wire necessary for high frequency short-stroke motion sources.

While reading the following detailed description, the following definitions will be used to refer to four different elements of the invention as wire. The type of wire under discussion will be defined in the text.

1. Electrical wire—used to pass electrical energy to elements in order to perform a specific task. The wire is stranded and is made of copper or aluminum and is insulated for electrical hook up.

2. Magnet wire—used to make electro-magnets as shown, for example, in FIG. 4. This wire is solid copper or aluminum and is insulated with a varnish-like material.

3. Mechanical wire—used to link motion or force to an end effector member (solid stainless steel fluted tendon wire; see, for example, FIG. 8).

4. Shape memory wire—solid state nickel-titanium alloy, which contracts or shortens when energized with an electric current.

BRIEF DESCRIPTION OF THE DRAWINGS

The present invention will be more fully understood by reference to the following detailed description of the preferred embodiments of it when read in conjunction with the accompanying drawings, in which like reference characters refer to like parts throughout the views and in which.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviation from the invention as portrayed. The preferred embodiments are discussed hereafter.

Figure 1:
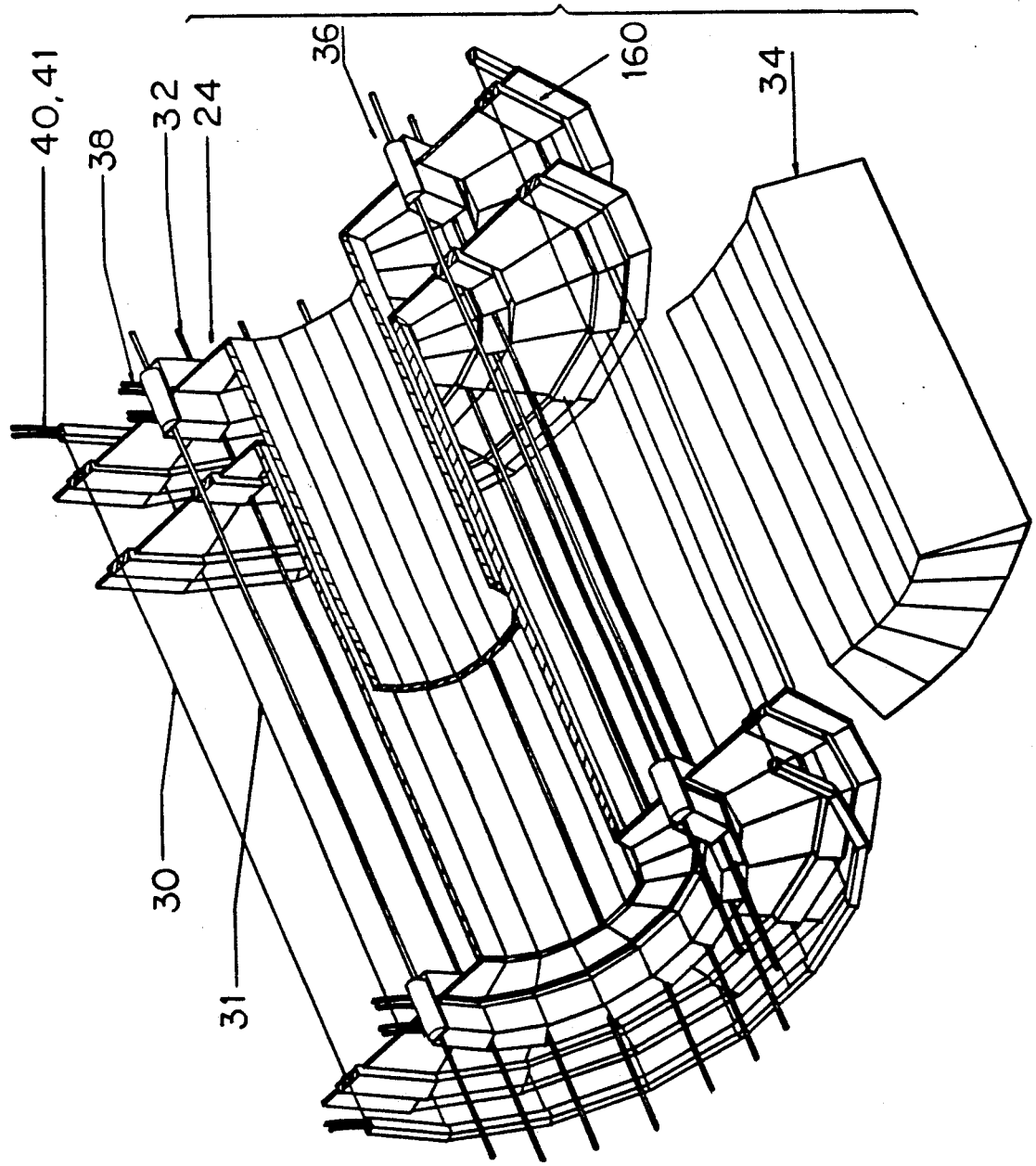
FIG. 1 is a perspective, partially fragmentary, exploded, and sectional view of an embodiment of the actuator system according to the present invention illustrating an array of memory and mechanical alloy control element wires disposed about a moving assembly.

Referring to FIG. 1, the multiplexing actuator system according to the present invention is generally built symmetrically around a telescoping frame.

The telescoping frame includes a parallel array of control elements extending in an axial direction, here comprised of the fluted tendon wires 32.

Extending axially within the main body portion also mounted is a first array of shape memory alloy wires 30 and a second array of shape memory alloy wires 31. (This material often goes under the brand name of Nitinol [trademark]. These wires are composed preferably of a nickel-titanium shape memory alloy that shortens when heated to a specific temperature by electrical activation. These wires are five-thousandths of an inch thick and each pulls up to ten ounces of force. They are capable of contracting up to five percent of their length. The wires 30, 31 used in the preferred embodiment have an electrical resistance of about 20 ohms/ft., and almost no weight. The array of 14 wires in the preferred embodiment generates a pull of 8.5 lbs., the backup and primary simultaneously, generate a pull of up to 17.0 lbs. Each Nitinol wires is discretely connected through wire 40 and 41. The Nitinol wires are suspended in insulating clips 160 between end plates 22 and 24. Nitinol wires are separated, insulated and thermally cooled by liquid saturated felt-like material 34. Larger diameter wires and (or alternatingly) a larger number of existing wires in the clips 160 will enable more powerful actuators.

At one end of the main tube 14 is a member comprising a moving clutch plate 24. At the other end of the main body portion is another member comprising a fixed clutch plate 22. The clutch plate 24 is movable in an axial direction within the tube 14 and the fluted tendon wires 32 pass freely through each plate 22, 24. This will be developed in detail with respect to FIG. 3. Fluted wire clutches 36 are mounted on plate 22 and 24 and are electrically energized by wire 38.

Figure 2:
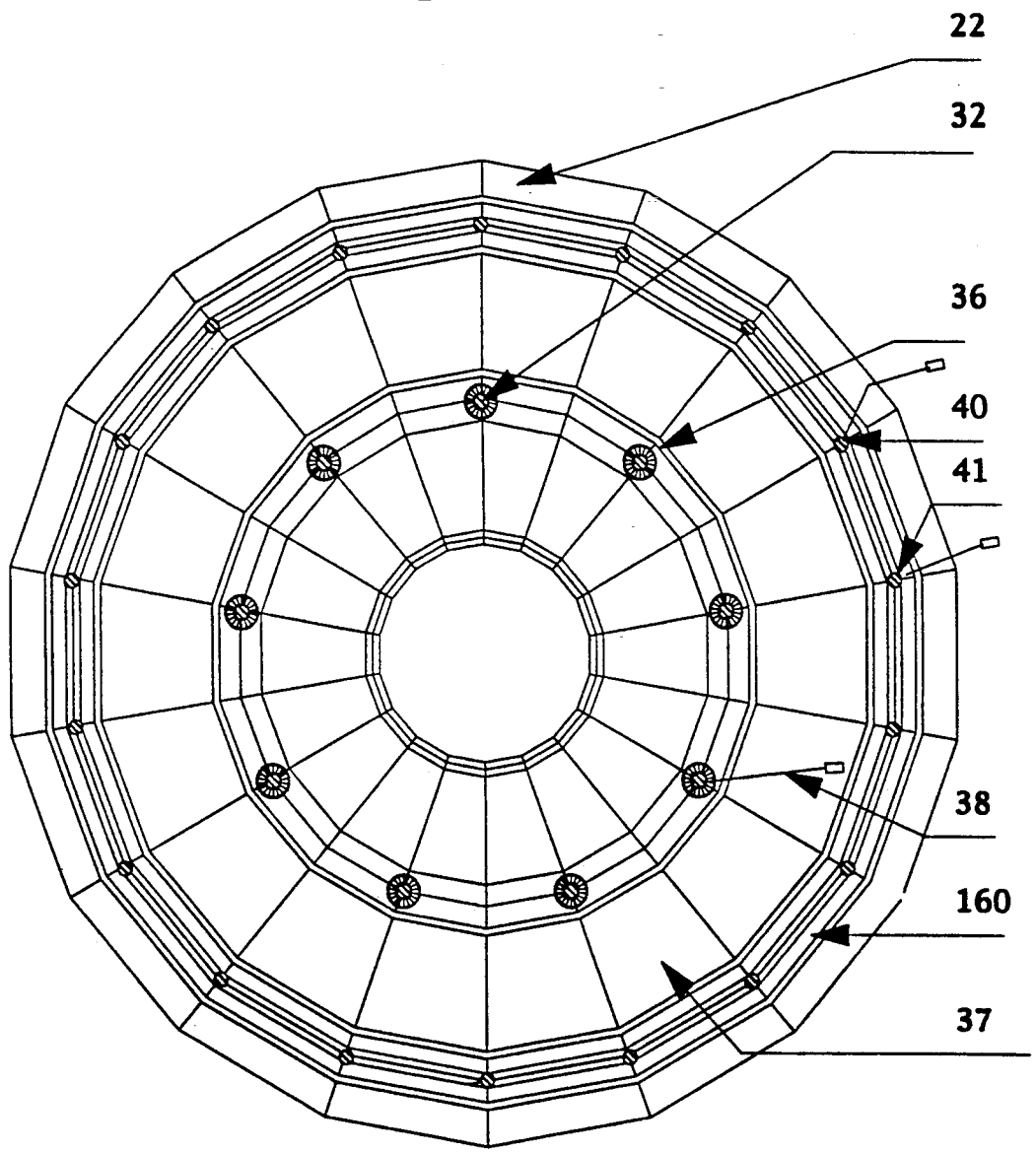
FIG. 2 is an end view of the embodiment of FIG. 1.

Referring to FIG. 2, an end view of the clutch plate is illustrated. This is a view of the end of either the actuator of FIG. 1 or the internal clutch plate of FIG. 3 (discussed below). This may be considered as illustrative of either the end housing moving plate 24 or the fixed plate 22. In either instance, the features are to be described hereafter are substantially the same.

Each of the fluted steel tendon wires 32 is shown as passing through a clutch 36. The clutch 36 will be described more fully below with respect to FIGS. 4, 5 and 6. The clutches 36 are preferably electrically operated, and hence each clutch includes a pair of power leads 38. As the memory wires 30, 31 are also operated by electric power, a power connector 40 is provided for each wire 30, 31 to provide power thereto. The clutch plates are composed of interchangeable circle segments 37 to facilitate assembling custom actuators. Fluted wire numbers and sizes and Nitinol wire numbers and sizes per segment can be varied within the confines of the area of the circle footprint. Larger footprints are buildable with larger frame sizes.

Figure 3:
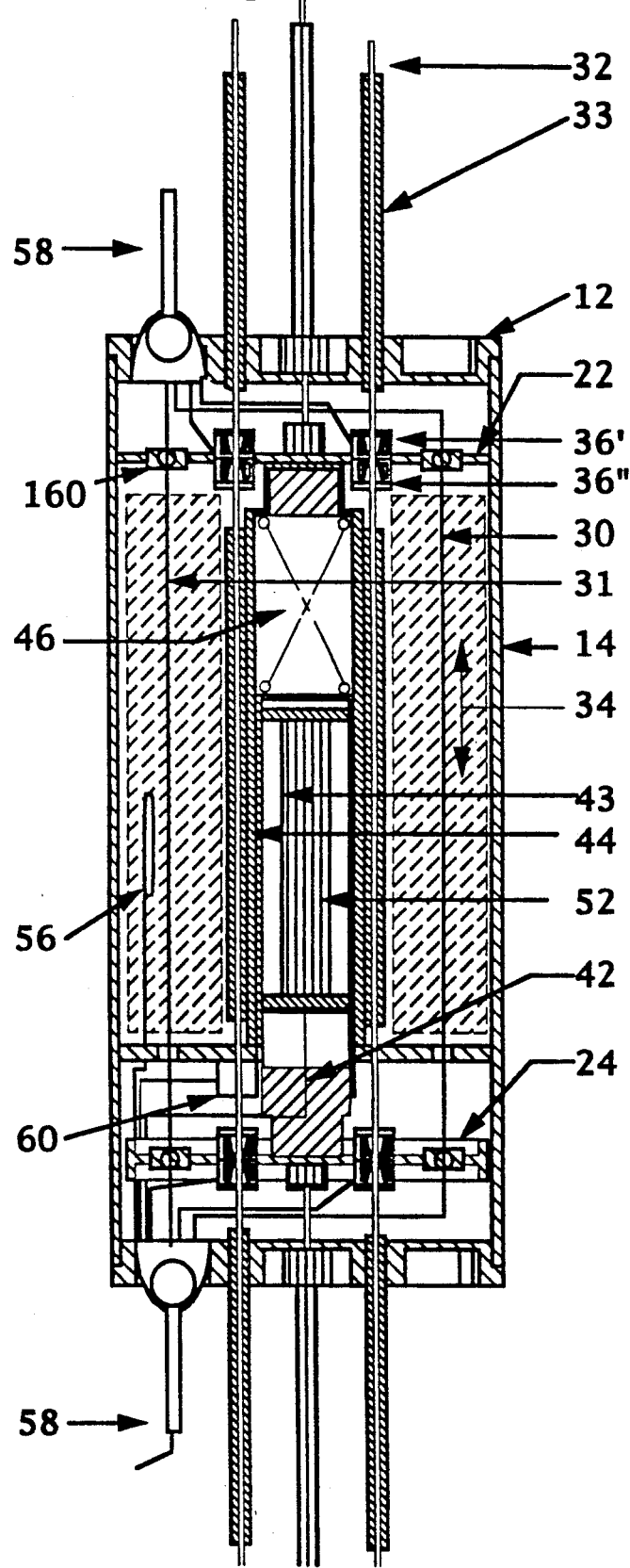
FIG. 3 is a longitudinal sectional view of the assemblies shown in FIGS. 1 and 2.

Referring to FIG. 3, a sectional view of the main body portion 14 is illustrated. This view illustrates the main components of the main body portion 14, which is substantially composed of a pair of telescoping metal tubes 43, 44. A spring 46 is provided for return motion.

Tendon power level selection can be made by a series of trial and feedback tests while using ever-decreasing numbers of memory wires until overload feedbacks are first tripped. The computer program also keeps count of wire actuations so that all wires have a "level-of-use profile". In the preferred configuration there is an on-line spare set of driven-shape memory alloy wires provided (not shown). The computer can select and energize either or both of the first array of shape memory alloy wires 30 by power connector 40 or the second array of shape memory alloy wires 31 by power connector 41 (see FIG. 2).

The fluted tendon wires 32 pass through the clutch plate 24, through the tube 14, and through the end plate 12 (see FIG. 3). Each of the wires 32 may be attached to a load to be pushed or pulled from either end. The tendon wire is mainly a tension linkage, but it also enjoys light use as a compression linkage. The familiar dot matrix printer uses pushed wires as hammers to strike the page, making dots to form letters. The tendon wires 32 may be moved in either direction, locked in position, or remain unlocked, thereby allowing free back-and-forth movement. Accordingly, the wires 32 provide motion, the memory alloy wires 30, 31 provide compressing movement, and the spring 46 provides expanding movement. The second array of memory alloy wires 31 offers fail-safe redundancy and the means to extend the power capability. A failed or disabled memory wire will not greatly effect the system performance as its loss will be compensated for with feedback.

Internally provided within the tube 14 are mechanical memory wire stabilizers 34. The stabilizer in tube 14 of FIG. 3 is deployed continuously and is made of a felt-like material saturated with cooling liquid. The felt retains the wire separation, and the wicking action of the felt maintains the contact of the cooling liquid with the wire. Heat transfer from the wire is accelerated by the continuous contact of the liquid with the wire and large surface area of the tube 14. Any vapors generated by the heat sinking the memory wire condense on the inside of tube 14 and wick back into the felt tube for reuse. The tube 14 assembly is sealed and the remote ends of the tendon wire sheaths have wire seals. The entire actuator including the full length of the active tendon wire sheath system is thereby protected from external contaminants. The heater element 52 does not operate at a constant heat output rate. The multiplex actuator may be used in many environments, each having a variety of temperature ranges. Accordingly, a temperature feedback transducer 56 is provided within the chambers of the tube 14. As illustrated, the temperature transducer 56 is provided in close proximity to the memory wire in the saturated felt to measure and regulate wire actuation temperature along with the computer's heater temperature control program."

When electrical current passes through the memory wires 30, 31 and heats them, they contract by a molecular process (twinning) that behaves like a muscle contraction in the material. Both of a pair of arrays of clutches 36′, 36″ may be engaged and selected for the desired direction of movement of the tendon wire 32. When the memory wires 30, 31 have contracted to provide the desired stroke length, the electrical current on the wires is turned off and they cool. The compressed spring 46 subsequently pulls the molecular contraction back out of the wires to restore their original length. The one-way clutches 36′, 36″ are like two ratchets and, depending on which direction the tendon wire is to be moved, it will be pushed or pulled either by the compression or expansion motion of the telescoping actuator frame. The method of operation as described is substantially the basic operation.

To provide a more accurate control, a computer (not shown) is employed to energize the engagement of the arrays of clutches 36′, 36″, electrically activate memory wires 30, 31, and select the correct number of memory wire cycles required to move the tendon wires 32 the desired length. One cycle is equivalent to one "stroke".

The movement of the tendon wire 32 is determined from the motion of the telescoping tubes 43, 44. The tube is fitted with a feedback transducer 60 so that the computer can keep a running tally on all wire displacements and a history of the beginning and end of all strokes. After the memory wires 30, 31 cycle about 1000 times the wires tend to lengthen a small amount each cycle. During a wire's life expectancy of well over one million cycles a one percent change in length may be a cumulated. This change in length has been dubbed "cycle creep". The computer of the present invention is programmed to compensate for these changes by re-zeroing the beginning of the stroke and applying the appropriate power corrections to maintain the design stroke length. Cycle creep elongation will be minimized by the motion control computer strategy of energizing all arrays at the beginning of all motions and dropping the excess power a short time into the movement. This successful strategy is extending the life of memory wire currently under manufacturer's tests beyond 10 million cycles.

A stroke is considered to be a digital event with a starting position and an ending position. The computer will calculate all fractional strokes and their feedbacks and provide precise current control required to position. "Pulse Width Modulation" (PWM) control and vernier feedback are the hardware choices. The software control programs will be closed-loop.

Figure 4:
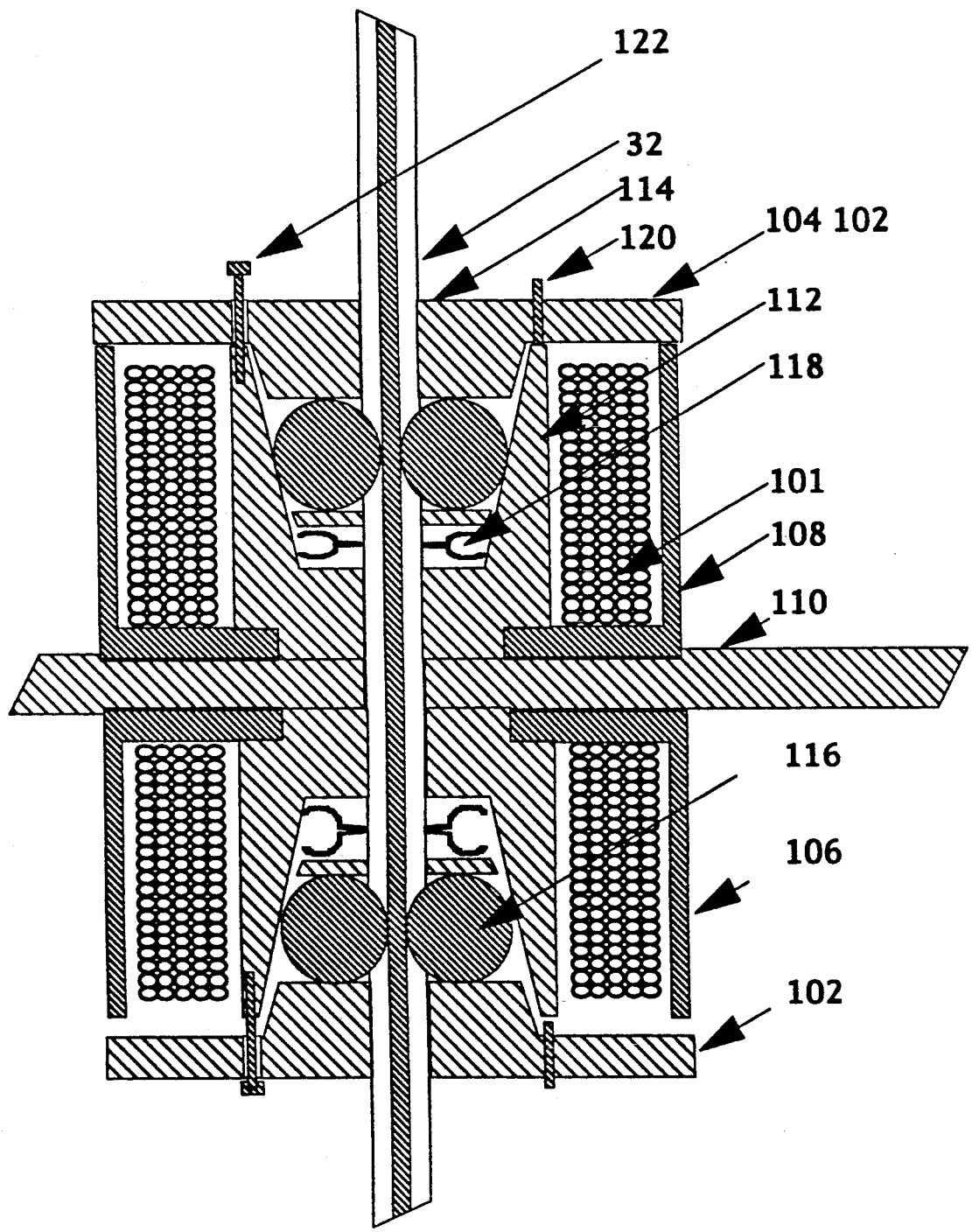
FIG. 4 is a sectional view of one embodiment of the one-way bidirectional clutch assembly according to the present invention.

Referring to FIG. 4, an illustration of the electromagnetic embodiment is disclosed in sectional view, the assembly generally being illustrated as 100. The assembly includes an upper ball carrier 104 and a lower ball carrier 102. An upper electromagnet 108 is provided to operate the upper ball carrier 104 and a lower electromagnet 106 is provided to operate the lower ball carrier 102. A clutch plate 110 is disposed between the electromagnets 106, 108 and the electromagnets are threadingly provided thereon. The entire clutch plate assemblies are represented in FIGS. 1 and 3 as elements 22 and 24. The limit to the number of clutches installed on one linear multiplexer 10 is determined by the system user's motion requirements for speed and power. The electromagnets 106, 108 are preferably composed of copper or aluminum electromagnet wire 101.

Each of the ball carriers 102, 104 includes a conically shaped ball assembly 114. The conically shaped ball assembly 114 includes movable hardened balls such as bearings 116, of which preferably three or more are provided for each assembly 114. Return springs 118 are provided for returning the lower or upper ball carriers 102, 104 respectively to their disengaged positions after the electrical circuit is broken.

Figure 5:
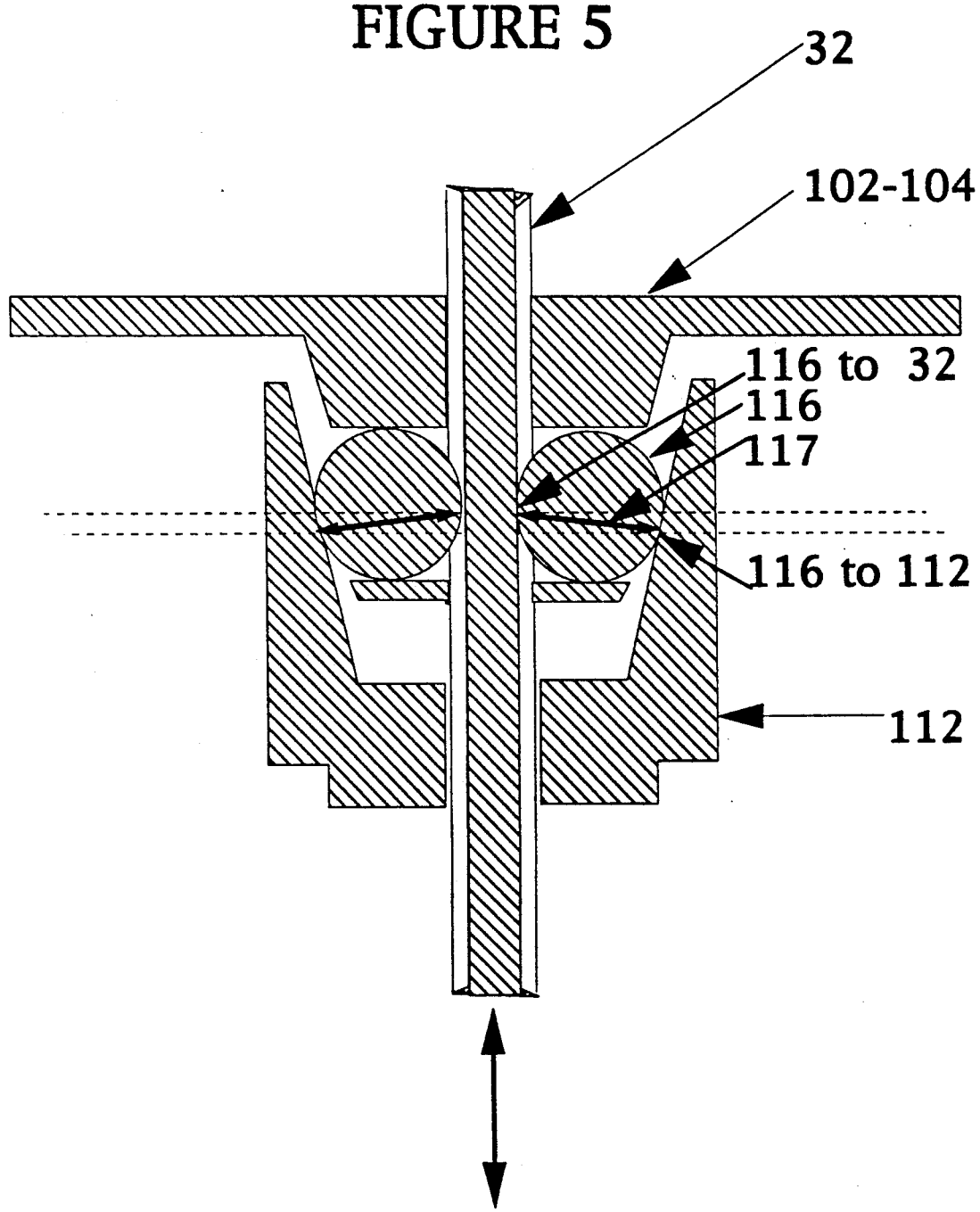
FIG. 5 is a detailed, sectional view of the main active mechanical elements of the clutch of FIG. 4.
Figure 7:
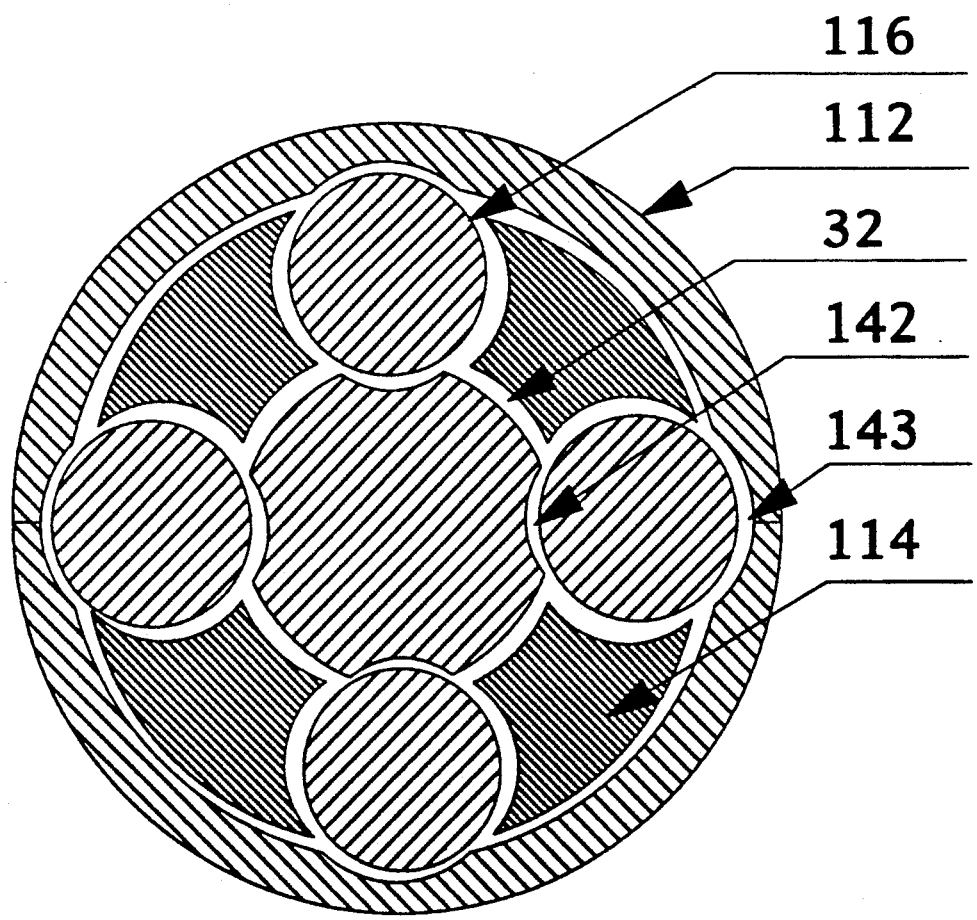
FIG. 7 is an end view of the fluted tendon wire and clutching balls rolled into the cup.

The assemblies 114 provided within electromagnets 106 are illustrated as being in their disengaged positions, with bearings 116 being loosely fitted between the fluted tendon wire 32 and the inner conical walls 112 of the electromagnets 106. The assemblies 114 provided within electromagnets 108 are illustrated as being in their engaged positions, with the bearings 116 being locked between the fluted tendon wire 32 and the inner conical walls 112 of the electromagnet 108. (See also FIG. 7 depicting the relationship between balls, wire, and cup with the carrier 114 removed from the view for clarity; see also FIG. 5 depicting the truss-bracing geometry.)

When the electrical current is applied, the assemblies 114 move toward the electromagnets 106, 108 until they are in the engaged position where the hardened bearings 116 contact both the fluted tendon wire and the inner conical walls 112. Once the hardened bearings 116 have contacted the hardened cup walls 112, movement of the fluted tendon wire 32 rolls the bearings tightly into the hardened cup, causing them to be wedged in an "X" braced truss pattern like a four-legged tripod. (See FIGS. 5 and 7.) Because of the truss wedging action, all four hardened bearings and the fluted tendon wire are self-aligned in the center of the cup. The ball carrier 114 is floating on the fluted tendon wire and not touching the cup walls.

The engagement of the bearings 116 requires a small but precise force. The correct amount of force enables the preferred fluted tendon wire to resist all forward motion but easily releases to allow motion in the reverse direction. After engagement, further force on the fluted tendon wire is translated into larger truss wedging forces.

Each tendon wire 32 utilizes two clutch assemblies, each clutch assembly having two electromagnets. Utilizing a preferred number of six fluted tendon wires 32, the computer 58 needs to generate twenty-four clutch signals. The controlling computer 58, however, needs only to actively administrate those tendon clutches that are actually moving tendons 32 at a given time. All other fluted tendon wires 32 would be held fixed by the previous (either on or off but unchanging) clutch engagements of the clutches provided on the fixed plate 22.

The following table illustrates the possible clutch combinations and the results related to movements of one fluted tendon wire. FIG. 3 may be used here as a visual aid if it is placed with the connectors 58 toward the reader. The fixed and moving clutch plates and the clutches on these plates will be oriented to match the table. The wire direction will match the last column. ("D"=clutch disengaged; "L"=clutch engaged in left moving direction; and "R" clutch engaged in right moving direction)

| Fixed end 22 | Moving end 24 | Tendon motion 32 |
| --- | --- | --- |
| LD | LD | L |
| DR | DR | R |
| LD | DD | HOLD L LOAD |
| DR | DD | HOLD R LOAD |
| DD | DD | FREE TO MOVE |
| LR | DD | HOLD R & L LOAD |
| DD | LR | STROKE MOVEMENT |

In actual production the one-way clutches on the fixed clutch plate 22 would probably be built as normally engaged, and the clutches on the moving plate 24 would probably be built as normally disengaged as an energy saving strategy.

A pair of adjustment screws 120 is fitted to each ball carrier 102, 104 to limit the travel of the ball carrier into the clutch cup such that the balls can rotate selectively in and out of engagement with the cup when the tendon wire is pulled into or out of the cup. The bearings 116 rotate back into the cup to lock if the fluted tendon wire is moved back into the cup. The bearings 116 rotate out of the cup releasing the lock when the wire moves in the "out of the cup" direction. The one direction motion discrimination is adjusted by adjusting screw 120.

An additional pair of adjustment screws 122 is provided to limit the travel of the ball carriers 102, 104 when there is no power to the electromagnet. The release travel must be so limited in order to minimize travel and pick time during subsequent re-engagement. The release travel must on the other hand be enough to allow the complete free movement of the wire during the no current state. The adjustment of 122 is provided for this motion discrimination.

FIG. 5 illustrates a cross-sectional view of the wire 32, one of the ball carriers 102, 104, a cup insert 112, two of at least three hardened balls 116, and the mechanism of the directionally sensitive locking and release of the tendon wire when the one-way linear clutch is engaged. Tendon wire Wi)1 be prevented from moving down by the compression locking of the balls against the cup walls. Tendon wire motion upward will roll the balls out of the cup and release the lock. When the electrical current is applied, the assemblies 114 move until reaching the engaged position where the hardened balls contact both the fluted tendon wire and the inner conical walls 112. Once the bearings 116 have contacted the cup walls 112, movement of the fluted tendon wire 32 rolls the balls tightly into the cup, causing them to be wedged against each other and the tendon wire in a four-legged, tripod-like force bracing pattern 117 (see FIG. 7). Because of the tripod force bracing action, the balls will move until the forces are stable and equal on all legs.

In the balance position all parts are aligned, bracing each other in center of the cup. Large vibrations or movements introduced into the load on the tendon wire will be compensated for by a flexible, dynamic, force balance at the head of the tripod. The ball carrier 114 is floating on the fluted tendon wire and not touching the cup walls. The total lock and release motion takes place in one-thousandths of an inch of fluted tendon wire movement and is repeatable to better than one percent. The clutch does not have to be released and re-engaged with each incremental movement; the only parts moving are the tendon wire and some almost micro movement of the clutch balls. Because of this design characteristic, the clutch mechanism will track (lock and release) piezoelectric drive frequencies from 0 Hz to and above 200 Hz. Tendon wire being incremented at this speed should translate into movement well within the realm of normal human motion.

Figure 6:
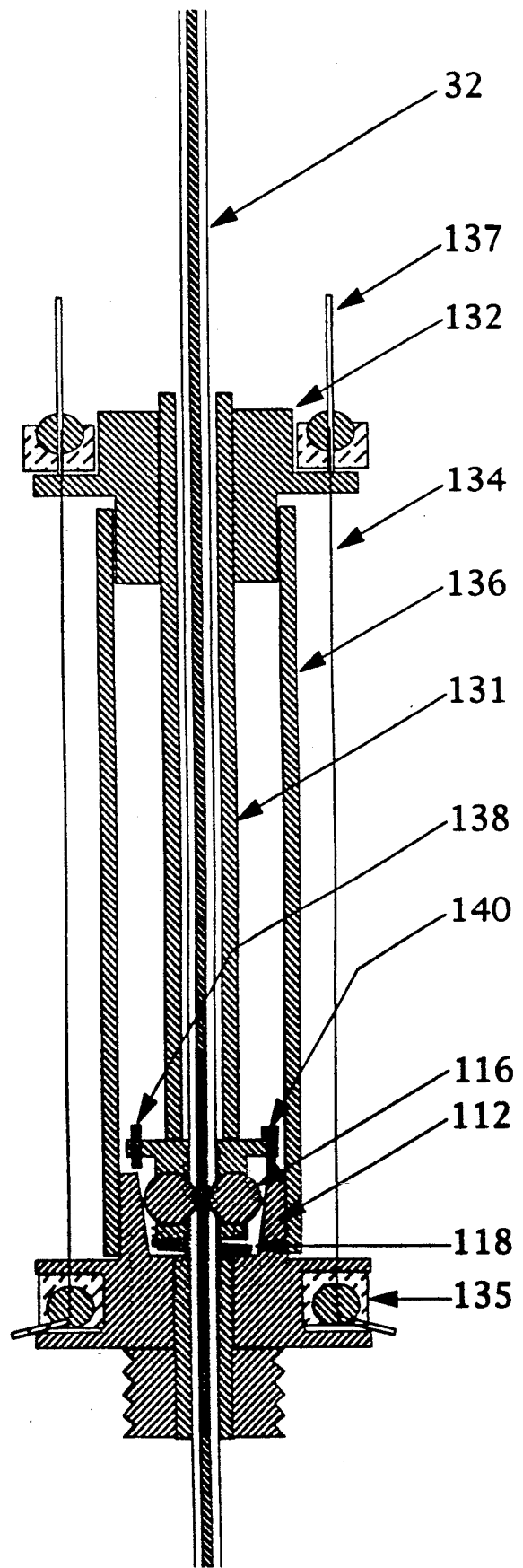
FIG. 6 illustrates a sectional view of an alternate embodiment of the one-way clutch assembly with the alternate shape memory wire actuation.

Referring to FIG. 6, an alternate embodiment of the clutch construction according to the present invention is disclosed. A shape memory wire-driven clutch is shown, and is generally indicated as 130. As FIG. 6 discloses, the single assembly 130 includes a ball carrier 132, although each bidirectional clutch assembly includes a pair of ball carriers 132. As may be understood, the interaction of the ball carriers 132 is substantially identical to that action of the assembly shown in FIGS. 4 and 5, except for the method by which the ball carriers 132 move to their engaged positions.

According to the present embodiment, a plurality of shape memory alloy wires 134 is provided having similar characteristics as those described above and with respect to FIGS. 1 through 3. A crimp ball 135 is provided near each end of the wires 134. An electrical connector 137 is fitted to each end of each wire 134 to allow an electrical contact point for a power supply (not shown). A depth adjustment screw 138 is provided to limit the insertion depth and force of the carriers 132. An additional travel adjustment screw 40 is provided to limit the movement of the carriers 132 when de-energized.

Figure 8:
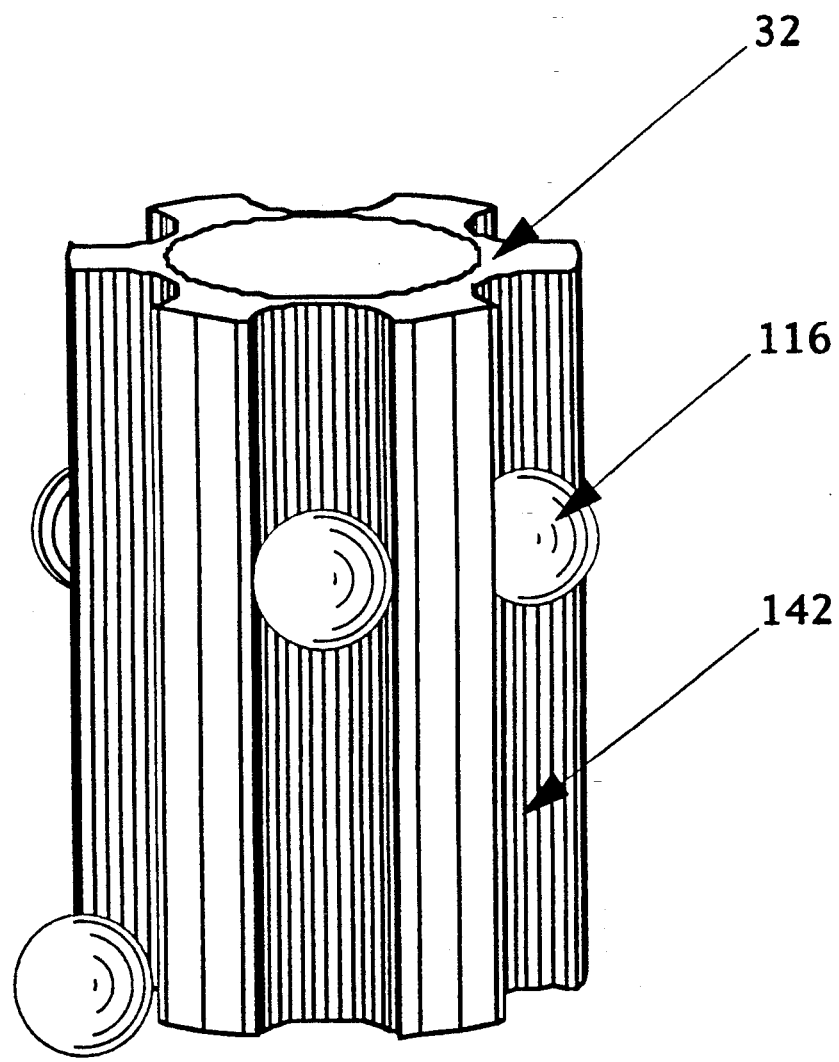
FIG. 8 is a peripheral view of two elements of FIG. 7 showing the extruded, fluted tendon wire with the balls rolling in the flutes.

Referring to FIGS. 7 and 8, the bearings 116 are illustrated in their relationship to the fluted tendon wire 32. Preferably the tendon wire 32 is composed of a piano wire metal. A number of longitudinal flutes or grooves 142 are defined in the wire 32, one track for each of the bearings 116. The flutes 142 act as tracks or seats for the bearings 116 and provide greater ball-to-wire contact area for distributing the clutching forces. Correspondingly the clutch cup 112 is also fluted 143 for greater contact area.

Figure 9:
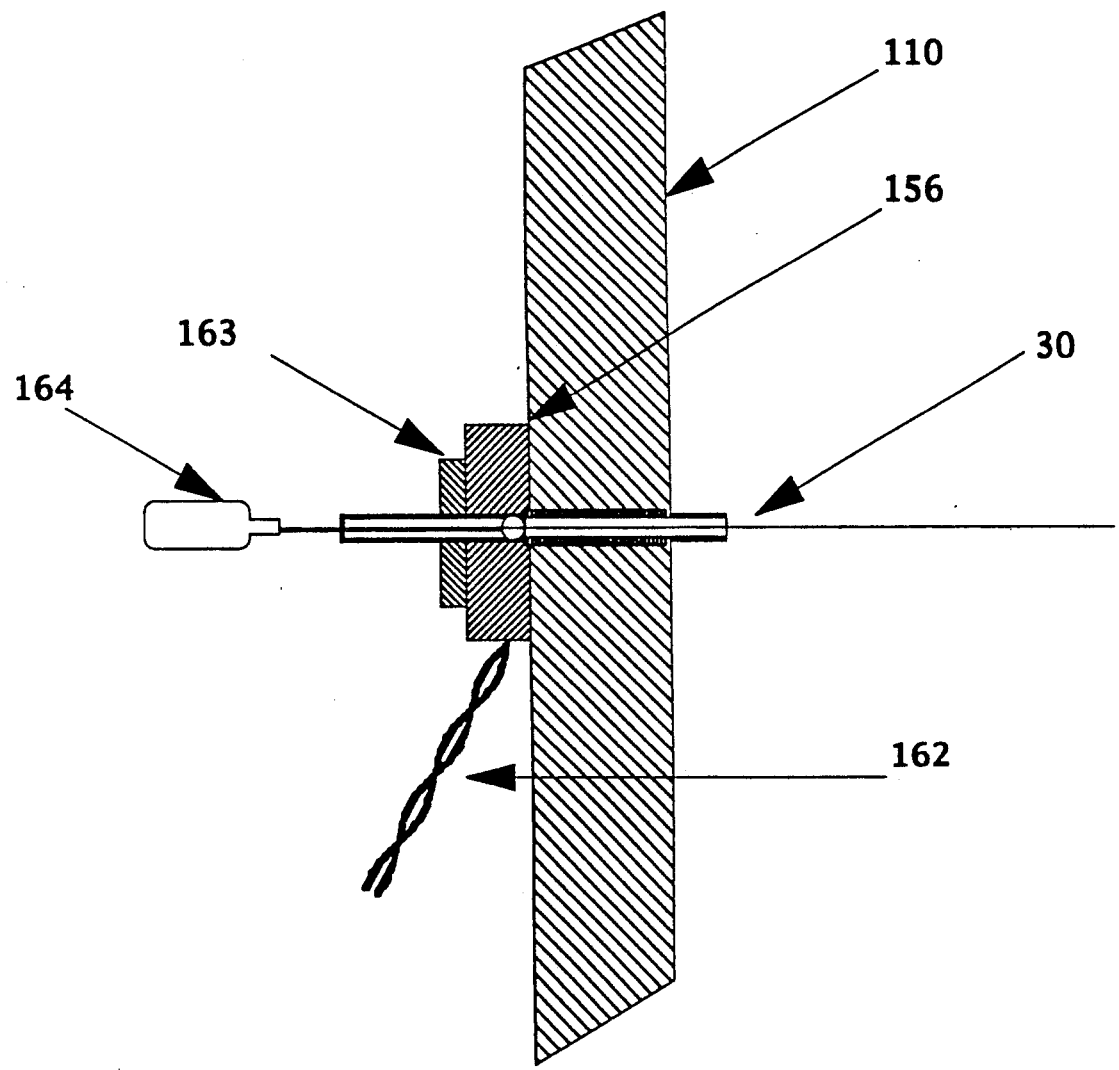
FIG. 9 is a sectional view of the memory wire overload feedback transducer of the present invention.

Referring to FIG. 9, a mechanism is depicted which for schematic purposes shows the transducer of the over-tension detector. Memory wire 30 is fitted through a tube, through a force transducer, through an adjustment nut and then fitted with an electrical connector. The wire 30 is crimped in the tube and the static start-up force adjustment set up. The program in the motion control computer 58 using feedback from several of these transducers implements the pulling profile of the MAIL system. Although it is envisioned that the strength of spring 46 (FIG. 3), the fluted tendon wire 32 and the memory wire 30, 31 will be selected according to system load requirement, the elements most vulnerable to overload are the individual strands of memory wire 30, 31. The unprotected individual strand wires can damage themselves if allowed to pull alone against the collective load. Accordingly, to alleviate this danger, an over-tension force transducer is placed on selected strands of the memory wires 30, 31.

The design stroke length for the telescoping tube is about one-fourth to one-half of the potential memory wire contraction range so that any creep or diminished contraction function can be repeatedly compensated for throughout the life of the mechanism. The stroke at the tendon wire is zeroed during each re-clutching by the motion computer. The stroke length is regulated through the power applied to the memory wire and feedback from the transducer 60 (FIG. 3). The second or "backup" array of memory wires 31 is also regularly exercised so that the system's total memory wire cycle life is doubled.

Figure 10:
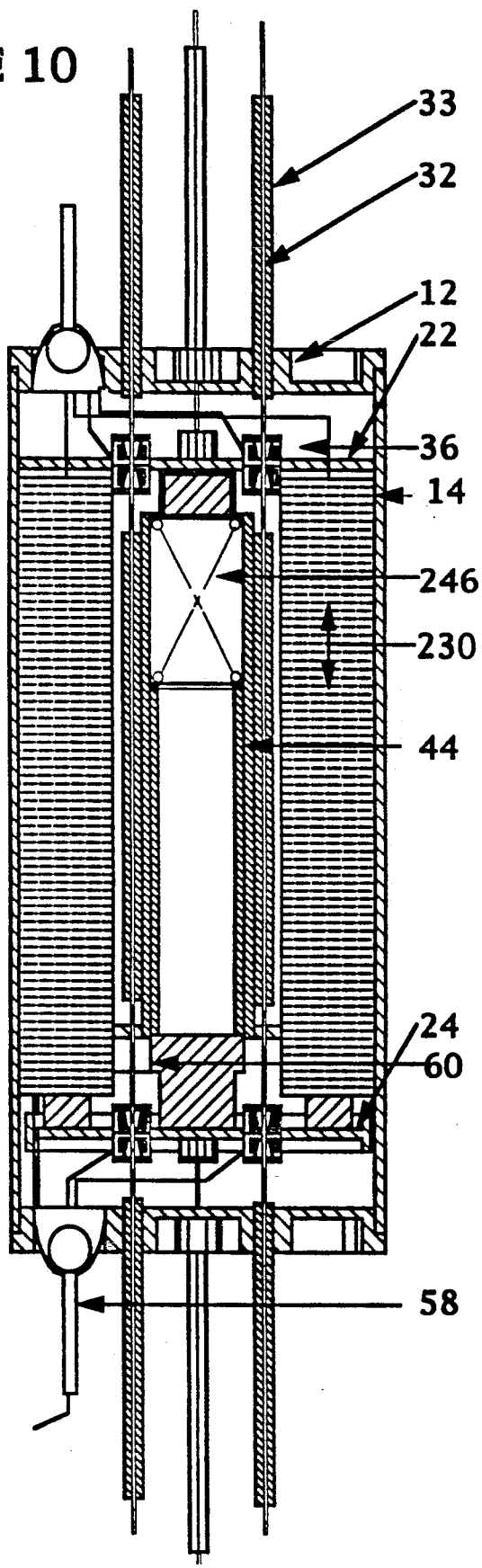
FIG. 10 is a sectional view of the MAIL frame fitted with two piezoelectric stack elements. This figure is essentially the same as FIG. 3 with the exception of elements 230, a piezoelectric stack which replaces the memory wire array 30 of FIG. 3, and element 246 which is an extension spring designed to pull clutch plate 24 back after expansion.

Referring to FIG. 10, a sectional view of the MAIL frame fitted with two piezoelectric stack elements is illustrated. This figure is essentially the same MAIL as FIG. 3 with the exception of elements 230 and 246. Element 230 is a piezoelectric stack which replaces the memory wire array 30 of FIG. 3. Element 246 is an extension spring designed to pull clutch plate 24 back after expansion. The chief differences between the piezoelectric MAIL and the memory wire MAIL is speed and power and weight. Even the slower operating electromagnetic clutch mechanisms ca take advantage of the piezoelectric speed because the clutches remain energized until the end of the motion. The clutch drives can also be upgraded with the faster piezoelectric elements.

Figure 11:
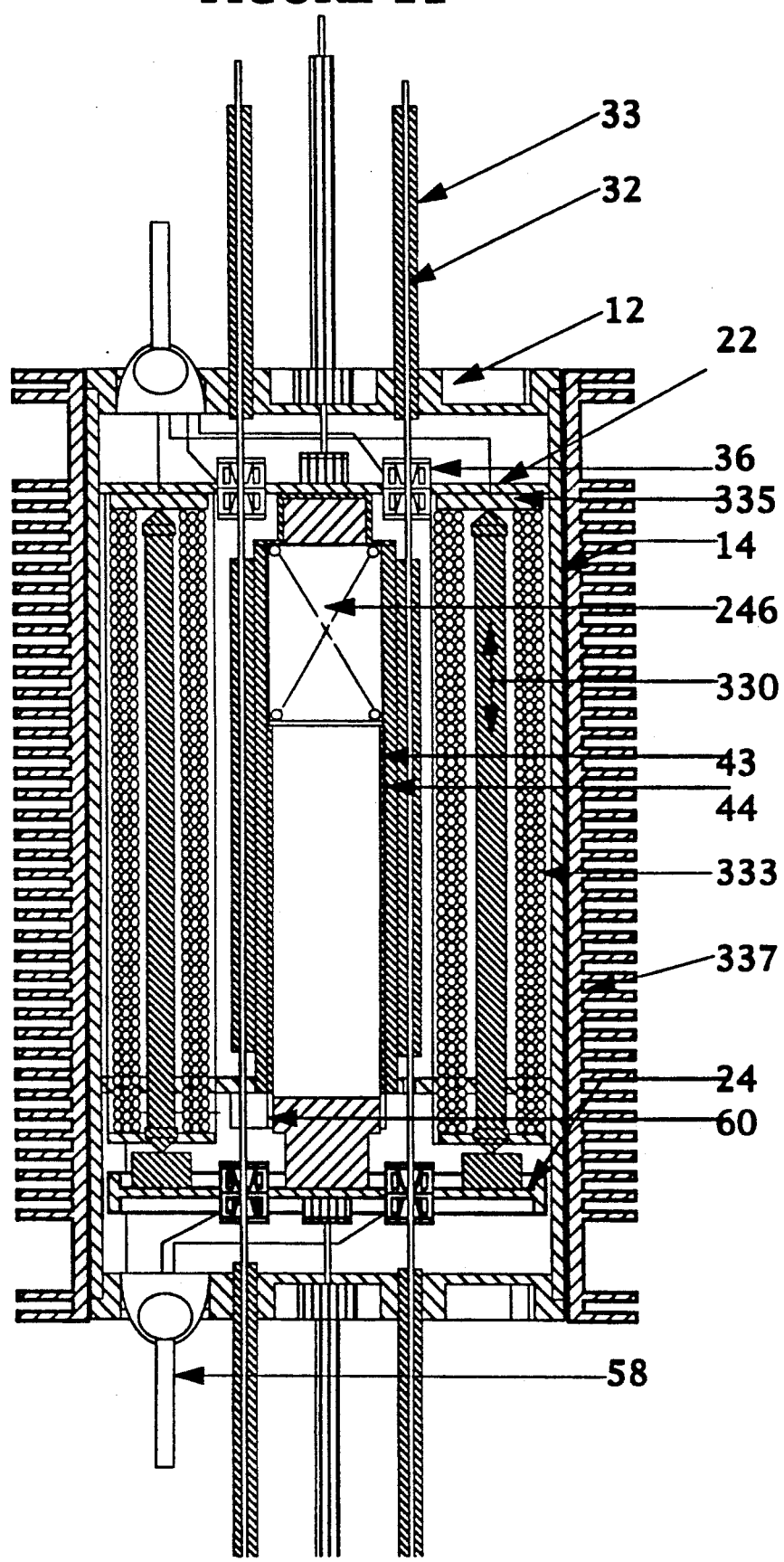
FIG. 11 is a sectional view of the MAIL frame fitted with two magnetostrictive actuators. This figure is essentially the same as FIG. 3 with the exception of elements 330, 333, 337 and 246.

Referring to FIG. 11, a sectional view is seen of the MAIL frame fitted with two magnetostrictive rod elements (ETREMA Terfenol-D [trademark]). Elements 330 are magnetostrictive rods. Elements 330 replace the memory wire array 30 of FIG. 3. These rod elements elongate while their electromagnetic fields are energized by a series of electromagnets 333. Element 246 is an extension spring designed to re-compress the telescoping body and supply the necessary prestress to the magnetostrictive rods. The magnetic pole pieces interact with the hardened rod caps to provide surfaces to absorb the 40.6 pound forces applied at microsecond rates. A ten-inch rod can grow in length to 10.02 inches which will provide just enough stroke for the MAIL. Longer strokes of 0.12 inches may be provided with a mechanical leverage at the ratios of 6:1. The magnetostrictive material has sufficient force to provide both modified stroke and power. Transferring heat away from the magnetic coils is accomplished with tube 14 body heat sink provided as finned tube 337.

Having described my invention, however, many modifications thereto will become apparent to those skilled in the art to which it pertains without deviation from the spirit of the invention as defined by the scope of the appended claims.

I claim:

1. An actuator system controllably producing linear movement, said system comprising:
   an array of elongated control elements extending parallel to each other in an axial direction;
   a movable member;
   drive means for selectively reciprocating said movable member in said axial direction;
   each of said control elements passing through said movable member so as to allow free relative movement therebetween as said movable member is reciprocated; and
   selectively actuatable coupling means to selectively couple one or more of any of said control elements to said movable member to cause movement of said selectively coupled element with said movable member, said coupling means allowing free movement of each of said control elements whenever said coupling means is not activated with respect to said control element.

2. The system according to claim 1 wherein said control elements comprise wires.

3. The system according to claim 2 wherein said wires are fluted and said coupling means comprises a series of one-way clutches carried by said movable member, each having balls engaging the flutes of a respective wire, said one-way ball clutches each selectively operable to grip said associated wire to be coupled thereto in one direction of axial movement of said movable member.

4. The system according to claim 1 further including a fixed member fixed relative to said movable member and said control elements, said fixed member axially spaced from said control member, said driver means causing said fixed and movable members to move axially relative to each other during said reciprocation of said movable member.

5. The system according to claim 4 wherein said driver means comprises an array of memory wire elements interconnecting said fixed and movable members, said memory wire elements configured to shrink and tend to bring said fixed and movable members towards each other from an initial axially spaced position when heated, and means for selectively energizing said memory wire elements to be heated to cause said movement, and return spring means restoring said fixed and movable members to said initial axially spaced position after de-energizing said memory wire elements.

6. The system according to claim 4 wherein said driver means comprises a stack of piezoelectric elements interconnecting said fixed and movable members, said piezoelectric elements when energized causing relative axial movement therebetween, and further includes means for selectively energizing said stack of piezoelectric elements.

7. The system according to claim 4 wherein said driver means comprises magnetostrictive elements interconnecting said fixed and movable members, drawn together when energized, and means for energizing said magnetostrictive elements.

8. The system according to claim 1 wherein said coupling means includes means for selectively coupling any individual or group of control elements to said movable member in either axial direction of reciprocation of said members, whereby said control element or groups of control elements can be incrementally advanced in either direction.

9. The system according to claim 8 wherein said coupling means comprised pairs of oppositely acting selectively activated one-way clutches associated with each control element and means for selectively activating one or more of said clutches of each pair to cause movement of an associated control element or elements in either axial direction.

10. The actuator system according to claim 1 further including a fixed member axially spaced from said movable member and also receiving said control elements freely passing therethrough, and further including coupling means associated with said fixed member and each of said control elements allowing holding of one or a group of said control elements as said movable member is reciprocated by said driver means.

11. The actuator system according to claim 10 wherein said coupling means associated with each fixed and movable member includes selectively activated one-way clutch means coupling said one or a group of control elements to either said fixed or movable member in either axial direction during reciprocation of said movable member.

12. The actuator system according to claim 11 wherein said one way clutch means comprises pairs of oppositely acting one-way clutches associated with each control element mounted to each of said fixed and movable members, and means for selectively activating each of said clutches independently of the other clutches to enable gripping of each control element to be coupled to either said fixed or said movable member during reciprocation of said movable member in either axial direction.

* * * * *